(12) United States Patent
Chang

(10) Patent No.: US 7,417,771 B2
(45) Date of Patent: Aug. 26, 2008

(54) ERROR DIFFUSION HALFTONING SYSTEM

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 781 days.

(21) Appl. No.: 09/892,332

(22) Filed: Jun. 26, 2001

(65) Prior Publication Data
US 2002/0196484 A1    Dec. 26, 2002

(51) Int. Cl.
G06K 15/00    (2006.01)
H04N 1/40    (2006.01)
H04N 1/405    (2006.01)

(52) U.S. Cl. .................. 358/3.03; 358/3.05; 358/3.22; 382/237

(58) Field of Classification Search ............. 358/1.9, 358/3.03, 3.05, 3.22; 382/237, 252, 205
See application file for complete search history.

(56) References Cited

U.S. PATENT DOCUMENTS

| 5,159,471 | A | * | 10/1992 | Satou et al. ............... 358/466 |
| 5,493,416 | A | | 2/1996 | Fan |
| 5,535,019 | A | | 7/1996 | Eschbach |
| 5,553,166 | A | * | 9/1996 | Kakutani ................... 382/252 |
| 5,611,022 | A | | 3/1997 | Estrada et al. |
| 5,627,659 | A | | 5/1997 | Kakutani |
| 5,633,729 | A | * | 5/1997 | Smith et al. ................ 382/251 |
| 5,692,109 | A | | 11/1997 | Shu |
| 5,737,453 | A | | 4/1998 | Ostromoukhov |
| 5,739,917 | A | | 4/1998 | Shu |
| 5,757,976 | A | * | 5/1998 | Shu .......................... 382/252 |
| 5,809,177 | A | | 9/1998 | Metcalfe et al. |
| 6,072,591 | A | * | 6/2000 | Harrington ................ 358/1.9 |
| 6,108,450 | A | | 8/2000 | Ueda |
| 6,169,608 | B1 | | 1/2001 | Yoshida |
| 6,185,006 | B1 | | 2/2001 | Yoshida |
| 6,351,566 | B1 | * | 2/2002 | Zlotnick .................... 382/237 |
| 6,356,362 | B1 | * | 3/2002 | Ostromoukhov .......... 358/1.9 |

OTHER PUBLICATIONS

Robert Floyd and Louis Steinberg, An Adaptive Algorithm for Spatial Grey Scale, Int'l Symposium Digest of Technical Papers, 1975, pp. 36-37.

* cited by examiner

Primary Examiner—Edward L Coles, Sr.
Assistant Examiner—James A Thompson
(74) Attorney, Agent, or Firm—Chernoff, Vilhauer, McClung & Stenzel

(57) ABSTRACT

Artifacts of error diffusion halftoning are reduced by selecting a halftone threshold for a current pixel on the basis of an accumulated halftone error for the pixel and its neighbors.

12 Claims, 4 Drawing Sheets

ERROR DIFFUSION HALFTONING SYSTEM

CROSS-REFERENCE TO RELATED APPLICATIONS

Not applicable.

BACKGROUND OF THE INVENTION

The present invention relates to systems for displaying digital images and, more particularly, to systems employing error diffusion halftoning for displaying digital images.

A digital image is typically represented as an array of picture elements or pixels at some point during its storage and processing. The pixels, in turn, are represented by a value that quantifies the intensity of one or more chromatic color components of the image at the spatial coordinates represented by the pixel. The intensity is typically expressed as a value on a scale of gray levels extending between the "gray" extremes of black and white. In the case of a color image, the image is typically decomposed into a plurality of color planes. Each color plane comprises a gray scale image representing the intensity of the pixels for one of the three (for example, red, green, and blue) or four (for example, cyan, magenta, yellow, and black) color components of the image. The color image is created by superimposing the color planes for the image.

To provide visually appealing, realistic images, the intensity of a pixel is commonly expressed with a resolution of as many as eight or twelve bits. With eight bits the intensity can be resolved to 256 levels and with twelve bits the intensity can be resolved to 4096 levels. On the other hand, display mechanisms such as printers, typically cannot display a pixel at such fine levels of resolution. Most printers are limited to binary resolution, that is, the choice between depositing or not depositing a drop of ink at the pixel location. Some printers can select among a limited number of dot sizes or light and dark inks of a component color, but the resolution is still typically much coarser than that afforded by the input value for the pixel. To simulate the color resolution of the image, printers are designed to trade spatial resolution for color resolution in a process known as halftoning. In response to the high resolution input values for pixels of a region of the image, the printer is controlled to deposit ink at some percentage of the pixels in the corresponding region of the printed image. If done correctly, the human visual system will interpret the spaced dots of ink as an area of gray or color approximating the gray or color of the corresponding region of the original image.

One common halftoning method is "ordered dithering." The printer is instructed to deposit a drop of ink at a location on the print medium if the input value of the pixel at that location exceeds a threshold value. If the pixel's input value is less than the threshold, ink is not deposited at the location. In ordered dithering, a threshold matrix is conceptually overlaid on the output medium and differing thresholds included in the matrix are associated with the various pixel locations on the medium. While ordered dithering is computationally conservative, the probabilistic nature of the process produces unwanted artifacts under many conditions and, for some applications, it is desirable to apply a process than reduces the likelihood of these artifacts.

Error diffusion halftoning is a halftone method intended to improve on the results produced by ordered dithering. For error diffusion halftoning the high resolution input intensity value for the pixel is also compared to a threshold value to determine if ink is to be deposited at a pixel location. However, the threshold, which is often set at approximately one-half the maximum value of the pixel, generally does not vary as a function of pixel location. To achieve the halftone effect, the difference between the input value of a pixel and its "as printed" value or error is distributed among its unprinted neighbors and when a neighbor is printed, the accumulated error is added to the input intensity to obtain augmented input that is compared to the intensity threshold. For example, FIG. 1 schematically illustrates the distribution of error to neighboring pixels 22, 24, 26, and 28 when printing the exemplary pixel 20. For simplicity in the example, it is assumed that the pixel 20 has no accumulated error ($\Delta=0$) and the augmented input value (A) is equal to the input value of the intensity of the pixel (V=239). Since the augmented input intensity (A=239) exceeds the threshold (T=127), the printer is passed an instruction if the form of a binary value (B=1) to deposit ink at the pixel location. The difference between the augmented input value (A) and the "as printed" value of the pixel (B×255=1×255) is the total error ($\delta=-16$) which is distributed among the unprinted neighbors of pixel 20. In the example, the error is distributed according to the error filter weights first proposed by Floyd and Steinberg, ADAPTIVE ALGORITHM FOR SPATIAL GREY SCALE, SID INT. SYM. DIGEST OF TECH. PAPERS, 1975, that is, $7/16$ of the total error (−7) is distributed to the pixel 22 immediately to the left of the printed pixel 20. Lesser portions of the error are distributed to three other pixels, $3/16$ to pixel 28, $5/16$ to pixel 26, and $1/16$ to pixel 24 of the row immediately following the row in which the printed pixel 20 is located. Other error diffusion algorithms distribute different portions of the total error to other sets of pixels in the neighborhood of the printed pixel.

FIG. 2 schematically illustrates the accumulation of error for a pixel 40 and the effect of accumulated error on the threshold determination made when the pixel is printed. Images are typically printed in raster scan order and diffused error is accumulated for a pixel 40 as the neighboring pixels 42, 44, and 46 in the preceding row and the pixel 48 immediately to the left of the current pixel 40 are printed. In other known algorithms error is accumulated in a like fashion but in differing proportions and from different pixels in the neighborhood. When it is time to print the current pixel 40, the input value (V=230) is augmented by the accumulated error ($\Delta=25$) to obtain the augmented input value (A=V+$\Delta$=230+25=255) which is compared to the threshold value (T=127). Since the augmented input intensity exceeds the threshold, ink will be deposited at the current pixel 40 but since the augmented value (A) equals the "as printed" value (B×255=1×255) there is no error ($\delta=0$) to distribute to neighboring pixels. Since the "as printed" value of the binary pixel is either the minimum or maximum value of the pixel, substantial positive and negative error can accumulate. The accumulated error may be sufficient cause a pixel to be printed or not printed even though its input intensity value would justify the opposite result.

The magnitude of the threshold for error diffusion halftoning is generally independent of location and error diffusion is generally more accurate than the ordered dithering method. However, like ordered dithering, error diffusion is a quantization process and can produce artifacts in certain areas of an image. Error diffusion halftoning can produce "worms" or patterns of visible lines of dots, particularly in highlight areas. In addition, the diffusion of error to neighboring pixels can delay highlights by producing heavier patterns of dots in the later pixels of a halftone region. In midtone areas, error diffusion can produce a checker board effect that can visually interfere with a smooth transition between regions of the image. Error diffusion can also cause dots of differing colors to be deposited at the same pixel location. A magenta dot on a cyan dot produces a nearly black dot which can give the image a grainy look.

To reduce the artifacts produced by the four pixel diffusion of the Floyd and Steinberg algorithm, error filters with additional weights have been proposed to further diffuse the error. Filters with additional weights require more computation and can accentuate certain artifacts while reducing others. In addition, error diffusion combined with perturbation or dithering has been proposed. However, these methods are computationally expensive and often add the artifacts of dithering to the artifacts produced by error diffusion. A third method of artifact reduction is to perform a spatial examination with the original input pixel values and use the results of the examination to alter an error diffusion halftone threshold to make it easier or harder to deposit ink at the pixel. This method is very computationally intensive because of the need to perform the examination in addition to the halftoning process.

What is desired, therefore, is an improved halftoning method that reduces artifacts produced by the error diffusion halftone method and conserves computational resources.

DETAILED DESCRIPTION OF THE INVENTION

Figure 3:
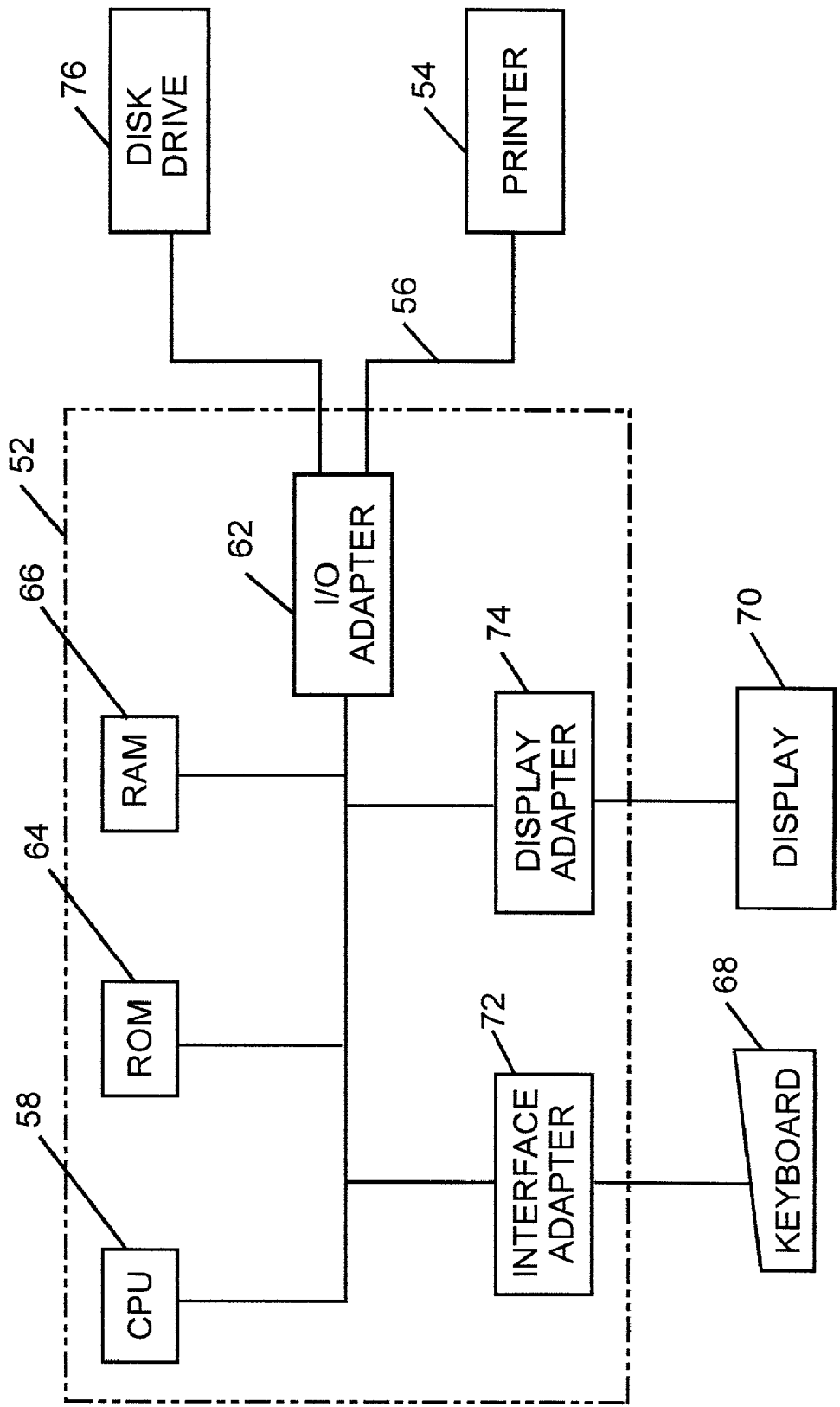
FIG. 3 is a block diagram of an exemplary computer system.

FIG. 3 depicts a typical personal computer system 50 including a personal computer 52 that transmits instructions to a display device, such as the ink jet printer 54. The instructions typically specify which of the individual pixels of an image are to receive a dot of ink and the color of the ink comprising the dot. The printer 54 receives these signals over an appropriate communication channel 56.

There are many configurations for computer systems utilizing printers that can apply the method of the present invention. In the exemplary computer system 50 a central processing unit (CPU) 58 transfers data to printer 54 over an internal bus 60 that is connected to the communication channel 56 by an input-output adapter 62. The CPU 58 fetches data and instructions from a variety of sources, including read-only memory (ROM) 64 and read-write, random access memory (RAM) 66. The personal computer system 50 also includes a key board 68 connected to the internal bus 60 of the computer 52 by an interface adapter 72. The keyboard 68 provides a mechanism for user input of data and instructions to the computer 52. The computer 52 also includes a display 70, such as a cathode ray tube or liquid crystal display monitor, connected to the internal bus 60 by a display adapter 74. The present invention is typically implemented as part of a printer driver, one of several components of the personal computer's operating system software that are stored on the disc drive 76 of the computer 52.

The computer 52 typically reads and operates on the instructions of the printer driver in response to a print command entered by a user from a user interface of an application program. The application program responds to the command with a system call requesting that the image be printed. The printer driver responds with a sequence of operations necessary to convert a representation of the image into the low-level printer instructions that will cause the printer 54 to appropriately place dots of ink on the print medium rendering the image as faithfully as the printer's limitations will allow.

For simplicity of description, it is assumed that the printer 54 is an ink jet printer capable of binary (ink or no ink) output of four color components (cyan, magenta, yellow, and black) at each pixel position. However, the method of the present invention is equally applicable to other types of printers and display devices, such as color laser printers and monitors, where the resolution of the displayed image is less than that of the original. For example, the method can be applied to printers that are capable of modulating the dot size or applying more than one shade of ink for a color component.

The image is typically decomposed into a plurality of color planes. A color plane is a gray scale image representing the intensity of a color component at each pixel location in the image. The color image is constructed by superimposing a color plane for each of the three or more color components of the image. The input intensity values of the pixels are commonly represented by eight bit or twelve bit numbers providing a relatively fine resolution of the pixel's intensity (256 levels or 4096 levels, respectively). The printer driver applies a halftoning operation to simulate the effect of the fine resolution input values of the pixels in a displayed image produced with the coarser resolution, typically binary resolution, permitted by the printer or other display device.

Halftoning is a quantization process in which a fine resolution input intensity value for a pixel is converted to a coarser resolution output value by comparing the input intensity of the pixel to a threshold intensity value. If the threshold is exceeded, the binary resolution printer 54 is directed to deposit ink at the pixel location, but if the input value is less than the threshold no ink is deposited. In error diffusion halftoning, the difference between the input intensity of a pixel, augmented with the error accumulated from previous pixels, and its "as printed" intensity value (in the case of binary output, either "0" or the maximum value of the pixel) is distributed to unprinted neighbors of the pixel. When one of these neighbors is printed, the accumulated error will be used to augment the input value of the pixel. Since the error can be positive or negative, augmenting the input intensity of a pixel with the accumulated error increases or decreases the likelihood that ink will be deposited for the pixel. While error diffusion halftoning provides generally good results, the printed output may include halftoning artifacts. For example, highlight areas may contain patterned lines of dots or "worms." On the other hand, error diffusion can produce a checker board effect that visually interferes with the smooth transition between regions of the image and the distribution of error to later printed pixels can cause dark in regions in the image. Further, dots of differing colored ink can be deposited at the same location. A magenta dot and cyan dot at the same location produces a nearly black dot which can give the image a grainy look. Yellow ink typically does not create the problem and the black ink of a four-color component printer is generally controlled by a different mechanism.

The halftoning artifacts are the result of uneven distribution of dots of the colored ink in halftoned areas of the image. While prior efforts to improve the uniformity of dot distribution have examined the area surrounding a pixel in the original image to determine how ink dots should be distributed in the displayed image, these methods are computationally intensive. The present inventor concluded that halftone artifacts can be reduced with less computation by revising the halftone threshold to make depositing ink at a pixel more or less likely on the basis of the error accumulated for its neighbors.

Figure 4:
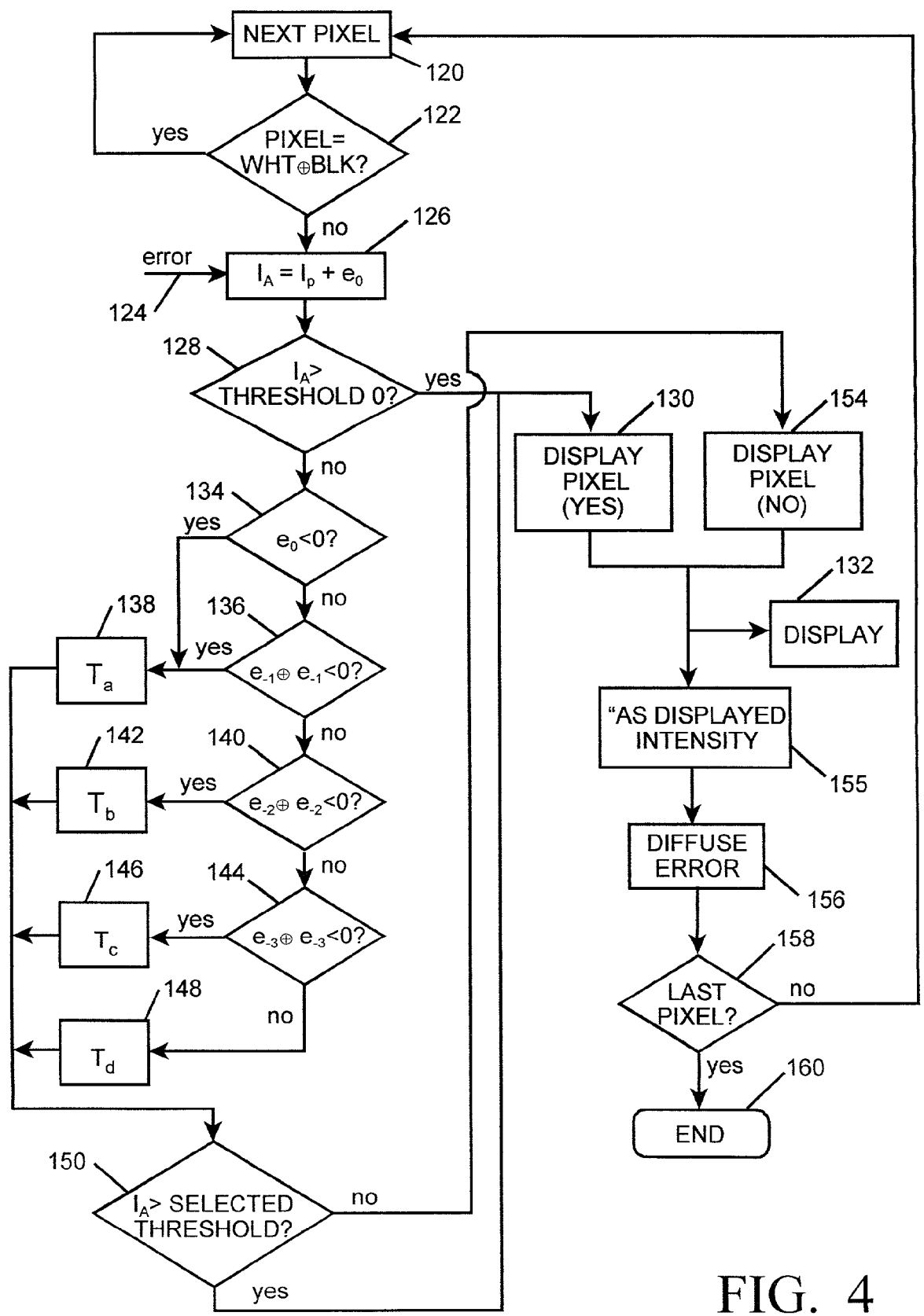
FIG. 4 is a flow diagram of the halftoning method of the present invention.
Figure 5:
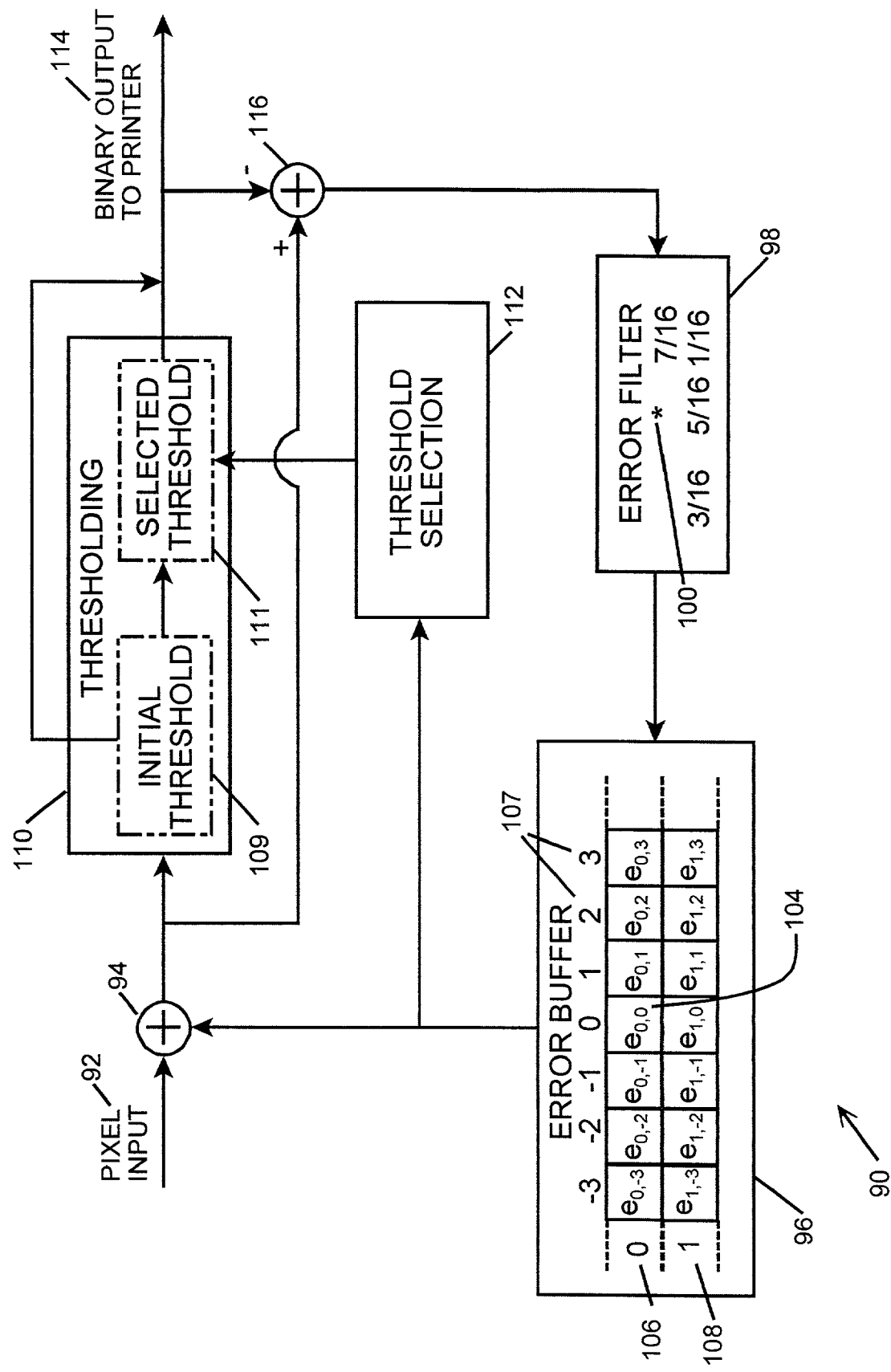
FIG. 5 is a block diagram of a halftoning encoder useful in applying the halftoning method of the present invention.

FIG. 4 depicts the error diffusion halftoning method of the present invention. The intensity of a gray scale color plane of an image or a gray scale image at spatial coordinates corresponding to a pixel to be printed (the "current" pixel) is converted to a discrete value and input to the method 120. If the pixel is white or black 122 the halftoning method is bypassed, an appropriate signal is sent to the printer by another process, and the next pixel is selected. If the current pixel is not black or white, the pixel's intensity is input 92 to the halftone encoder 90 depicted schematically in FIG. 5.

In a summer 92, the accumulated error for the current pixel ($e_{0,0}$) 124 is added 126 to the input intensity ($I_P$) to obtain an augmented intensity ($I_A$). The current pixel error ($e_{0,0}$) is obtained from an error buffer 96 in which error produced by printing prior pixels is accumulated for a number of pixels. For convenience, the error of the currently printing pixel is contained in the location designated by the index position "0" of row "0" ($e_{0,0}$). The exemplary encoder 90 utilizes the error filter 98 with filter weights first proposed by Floyd and Steinberg, ADAPTIVE ALGORITHM FOR SPATIAL GREY SCALE, Sid. Int. Sym. Digest of Tech. Papers, 1975. As illustrated, this error filter distributes the error produced by printing the current pixel 100 to the unprinted pixel immediately to the right of the current pixel and three neighboring pixels of the next row of pixels. The exemplary error buffer 96 includes the accumulated error ($e_{0,0}$) 104 for the current pixel 100 and a number of other pixels (designated by an index position relative to the index position for the current pixel) of the current pixel row (row 0) 106 and the next row (row 1) 108. Other error diffusion algorithms may diffuse the error over more remote pixels of the current pixel row or pixels of more remote rows and require an error buffer appropriate to store the accumulated error for the affected pixels. The error for each color plane may be stored in separate error buffers 96 or may be stored in a single buffer as interlaced data. Further, since threshold selection is determined by the sign of the accumulated error, the error buffer size can be reduced by storing only a sign bit for previously printed pixels.

In the encoder 90, the augmented intensity ($I_A$) of the current pixel is compared to one or more thresholds in a thresholding unit 110. To improve the sharpness of edges and fine details in the displayed image, the augmented intensity may be compared to an initial threshold (threshold 0) 128 in an initial threshold unit 109. The present invention improves the evenness of ink distribution to reduce the likelihood that halftone artifacts will develop. However, a more even distribution of ink reduces the sharpness of edges and details in the printed image. The initial threshold is relatively high (for example, $T_0=224$) compared to the other halftoning thresholds used in the method, but depositing ink at pixels having high augmented intensity increases the sharpness of the displayed image in appropriate areas and reduces the processing time. If the augmented intensity of the current pixel ($I_A$) exceeds the initial intensity threshold, the method outputs the binary signal (B=1) 130 to direct the printer to display or deposit ink at the pixel 132 and the pixel is assigned the maximum displayed intensity or "as printed" intensity value (for example, B×255) 155 for error diffusion 156.

Figure 1:
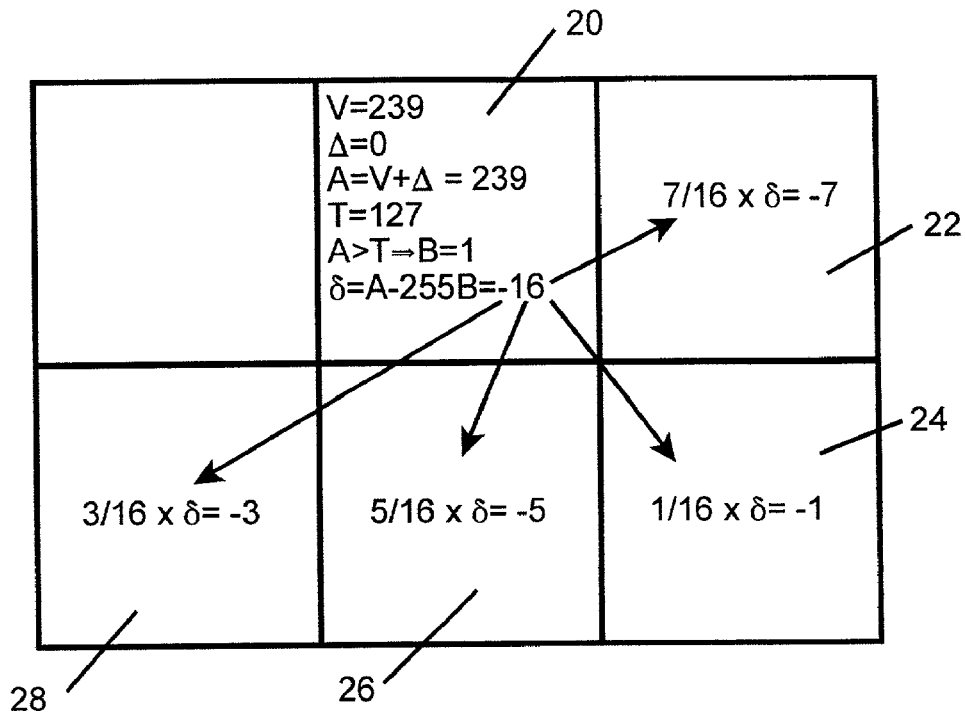
FIG. 1 is a schematic illustration of a diffusion of error in an error diffusion halftone method.
Figure 2:
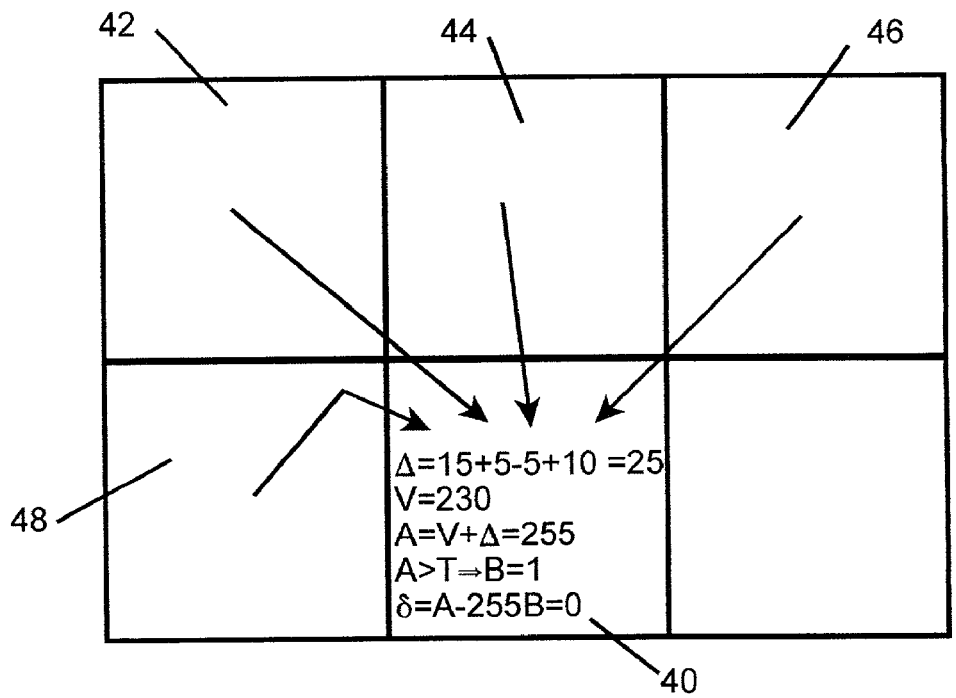
FIG. 2 is a schematic illustration of the effect of diffused error on a pixel of a halftoned image.

If the augmented intensity of the current pixel does not exceed the initial threshold 128, the augmented intensity will be compared to a threshold selected by the threshold selection unit 112. In the threshold selection unit 112, the accumulated errors for the current pixel and its neighbors are used to select an appropriate threshold intensity for comparison. The present inventor observed that halftoning artifacts can be reduced by improving the evenness of the ink dot distribution and that the accumulated error is an indication of the density of the ink dots in the vicinity of the currently printing pixel. Referring to FIG. 1, when a pixel 20 is printed, the pixel is assigned an "as printed" intensity value equal to the product of the maximum intensity for a displayed pixel and the binary output to the printer. When ink is deposited, the "as printed" intensity value of the pixel is maximized and negative error (δ) is distributed to the pixel's neighbors. Negative error, therefore, indicates the presence of an ink dot in the vicinity of the current pixel. The inventor concluded the error for pixels of the neighborhood could be used to select an appropriate halftoning threshold to evenly space the dots of ink.

In the threshold selection unit 112, the accumulated error for the current pixel ($e_{0,0}$) 134 and for the current pixel's immediate neighbors in the current row (($e_{0,-1}$) and ($e_{0,1}$)) 136 are compared to an error threshold to determine if one of the errors is negative. If the error of one of the pixels is less than zero, a first threshold ($T_a$) is selected 138 and input to the thresholding unit 110. If the accumulated error for each of the current pixel and the immediately neighboring pixels are positive, the errors for the next more remote pair of pixels (($e_{0,-2}$) and ($e_{0,2}$)) are examined 140. If the accumulated error of either of these pixels is negative, the threshold ($T_b$) 142 is input to the thresholding unit 110. If the errors accumulated for each of the current pixel and its nearer neighbors is positive, the errors (($e_{0,-3}$) and ($e_{0,3}$)) accumulated for a further remote pair of neighboring pixels are compared to an error threshold. If the error for either of these pixels is negative, the third threshold ($T_c$) is selected 146 and input to the thresholding unit 110. If the errors for each of the current pixel and its six neighbors are positive, a default threshold ($T_d$) 148 is input to the thresholding unit 110. The thresholds ($T_a$) 138, ($T_b$) 142, ($T_c$) 146, and ($T_d$) 148 have successively smaller values and are selected by experimentation. For example, in the prior art error diffusion methods the threshold value for eight bit resolution pixel intensity is typically approximately 127 (255/2). To more evenly distribute ink in a halftone region of an image and reduce halftone artifacts, the plurality of thresholds Ta=200, Tb=180, Tc=160 and Td=120 has been found to produce good results.

Negative error accumulated for the current pixel or its nearest neighbors indicates the presence of an ink dot in the vicinity and the higher threshold value reduces the likelihood that the current pixel will receive ink, pushing apart the ink dots in the printed image. Negative error for more remote neighbors indicates a likelihood of an ink dot in the vicinity but since the dot is more remote from the current pixel the visual impact is reduced. The lower threshold values adjust for the reduced visual impact of the more remote ink dots. A default threshold ($T_d$) 148 having a value slightly less than the traditional error diffusion threshold has been found to be useful in balancing the dot spreading produced by the present method.

To reduce the likelihood of depositing a cyan dot and a magenta dot at the same location, negative error in one color plane can be considered when printing pixels in the other color plane. If the error is stored as an interlaced value in the error buffer 96, a negative error for either component color is considered negative error for the other component when selecting the halftone threshold.

In the thresholding unit 110, the augmented intensity of the current pixel ($I_A$) is compared to the selected threshold 150 in the selected threshold unit 111. If the augmented intensity exceeds the selected threshold, a pixel display signal 130 (a binary "1" for the exemplary, binary printer) is output by the encoder 114 and the pixel is displayed 132. If the augmented intensity does not exceed the selected threshold 150, a pixel "not displayed" signal 154 (binary "0") is output by the encoder 114.

The pixel display signal is also input to summer 116 where the total error produced by the current pixel is determined by multiplying the binary printer signal value by the maximum value of a pixel to obtain an "displayed" pixel intensity which is subtracted from the augmented input intensity for the current 155. The total error is input to the error filter 98 and diffused to the neighboring pixels 156 as apportioned by the filter weights. If the current pixel is the not last pixel of the image 158, the next pixel is input to the process 120. If the current pixel is the last pixel 158, the halftoning process ends 160.

The halftoning method of the present invention reduces halftoning artifacts while preserving the sharpness of edges and image details by controlling distribution of the ink dots making up the halftoned image. The method computationally conservative and fast because it utilizes the accumulated error for pixels neighboring the printing pixel to select a threshold and control ink dot distribution.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of selecting an intensity threshold in a halftoning system used to render respective pixels of an image on a display, said halftoning system providing respective accumulated errors, each based on at least one respective variance between a rendered intensity of a pixel and a quantized measured intensity of a corresponding pixel of a contone image to be displayed, each respective accumulated error subject to recalculation pixel-by-pixel, said method comprising the steps of:
   (a) selecting a first predetermined intensity threshold if either one of said accumulated errors of a current pixel and a neighboring pixel exceeds a first error threshold;
   (b) selecting a second predetermined intensity threshold if said accumulated error of a pixel remotely neighboring said current pixel exceeds a second error threshold and said first predetermined intensity threshold is not selected;
   (c) selecting a third predetermined intensity threshold if neither of said first and said second intensity thresholds are selected; and
   (d) rendering a pixel of said image on a display based upon said selected predetermined intensity threshold.

2. The method of claim 1 wherein at least one of said first and second error thresholds is substantially zero error.

3. The method of claim 1 wherein an intensity of said first predetermined intensity threshold is greater than an intensity of said second predetermined intensity threshold and said intensity of said second predetermined intensity threshold is greater than an intensity of said third predetermined intensity threshold.

4. The method of claim 1 wherein at least one of said accumulated errors of said first pixel, said neighboring pixel, and said remote neighboring pixel comprises a component color error for said pixel.

5. An error diffusion halftone image display method providing respective accumulated errors, each based on at least one respective variance between a rendered intensity of a pixel and a quantized measured intensity of a corresponding pixel of a contone image to be displayed, each respective accumulated error subject to recalculation pixel-by-pixel, said method comprising the steps of:

(a) determining an intensity of a current pixel in an image;
(b) augmenting said intensity of said current pixel with a current pixel accumulated error;
(c) selecting a first predetermined intensity threshold if either one of said current pixel accumulated error and an immediate neighboring pixel accumulated error is less than a first error threshold;
(d) selecting a second predetermined intensity threshold if a remote neighboring pixel accumulated error is less than a second error threshold and said first error threshold is not selected;
(e) selecting a third predetermined intensity threshold if a more remote neighboring pixel accumulated error is less than a third error threshold and neither of said first and said second error thresholds are selected;
(f) selecting a fourth predetermined intensity threshold if one of said first, said second, and said third predetermined intensity thresholds is not selected;
(g) displaying said current pixel with one of a first displayed intensity if said augmented intensity of said current pixel exceeds said selected predetermined intensity threshold and otherwise displaying said current pixel with a second displayed intensity; and
(h) assigning an error between said displayed intensity and said augmented intensity of said current pixel to at least one pixel neighboring said current pixel.

6. The method of claim 5 wherein at least one of said first, said second, and said third error thresholds is substantially zero accumulated error.

7. The method of claim 5 wherein said first displayed intensity comprises a maximum intensity and said second displayed intensity comprises a minimum intensity for said pixel.

8. The method of claim 5 wherein said intensity of said current pixel comprises an intensity of a color component of said pixel.

9. The method of claim 5 wherein an intensity of said first predetermined intensity threshold is greater than an intensity of said second predetermined intensity threshold, said intensity of said second predetermined intensity threshold is greater than an intensity of said third predetermined intensity threshold, and said intensity of said third predetermined intensity threshold is greater than an intensity of said fourth predetermined intensity threshold.

10. The method of claim 5 further comprising the step of displaying said current pixel with a maximum displayed intensity if said augmented intensity of said current pixel exceeds a fifth predetermined intensity threshold, an intensity of said fifth predetermined intensity threshold being greater than an intensity of said first predetermined intensity threshold.

11. The method of claim 5 wherein at least one of said current pixel accumulated error, said neighboring pixel accumulated error, and said remote neighboring pixel accumulated error comprises a component color error.

12. The method of claim 11 wherein said component color error comprises an error for a component color other than the component color of the current pixel.

* * * * *